Dec. 9, 1924.  
C. D. RARICH  
VEHICLE BRAKE  
Filed Feb. 14, 1924
1,518,704
2 Sheets-Sheet 1
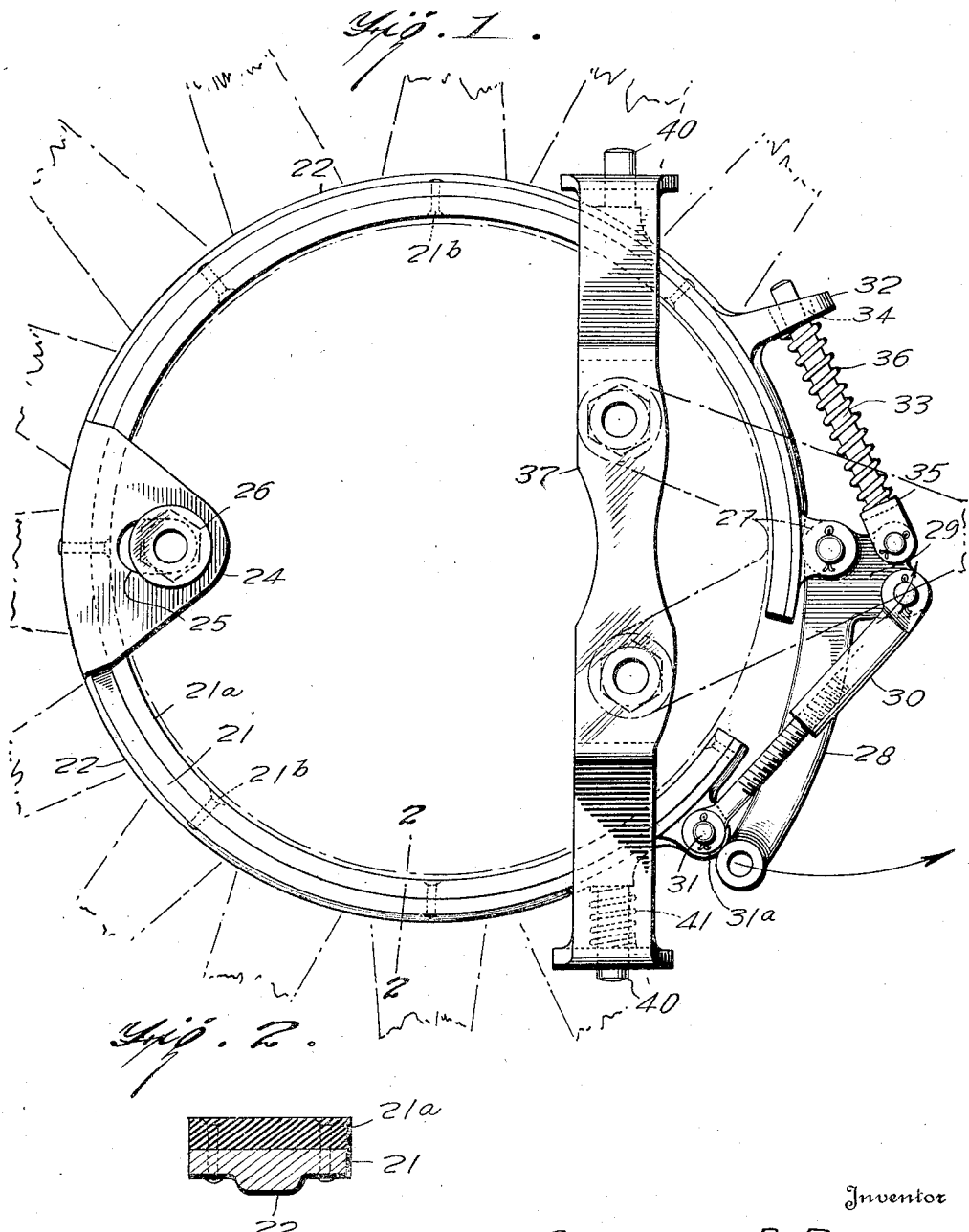

Dec. 9, 1924.                                      1,518,704
C. D. RARICH
VEHICLE BRAKE
Filed Feb. 14, 1924          2 Sheets-Sheet 2
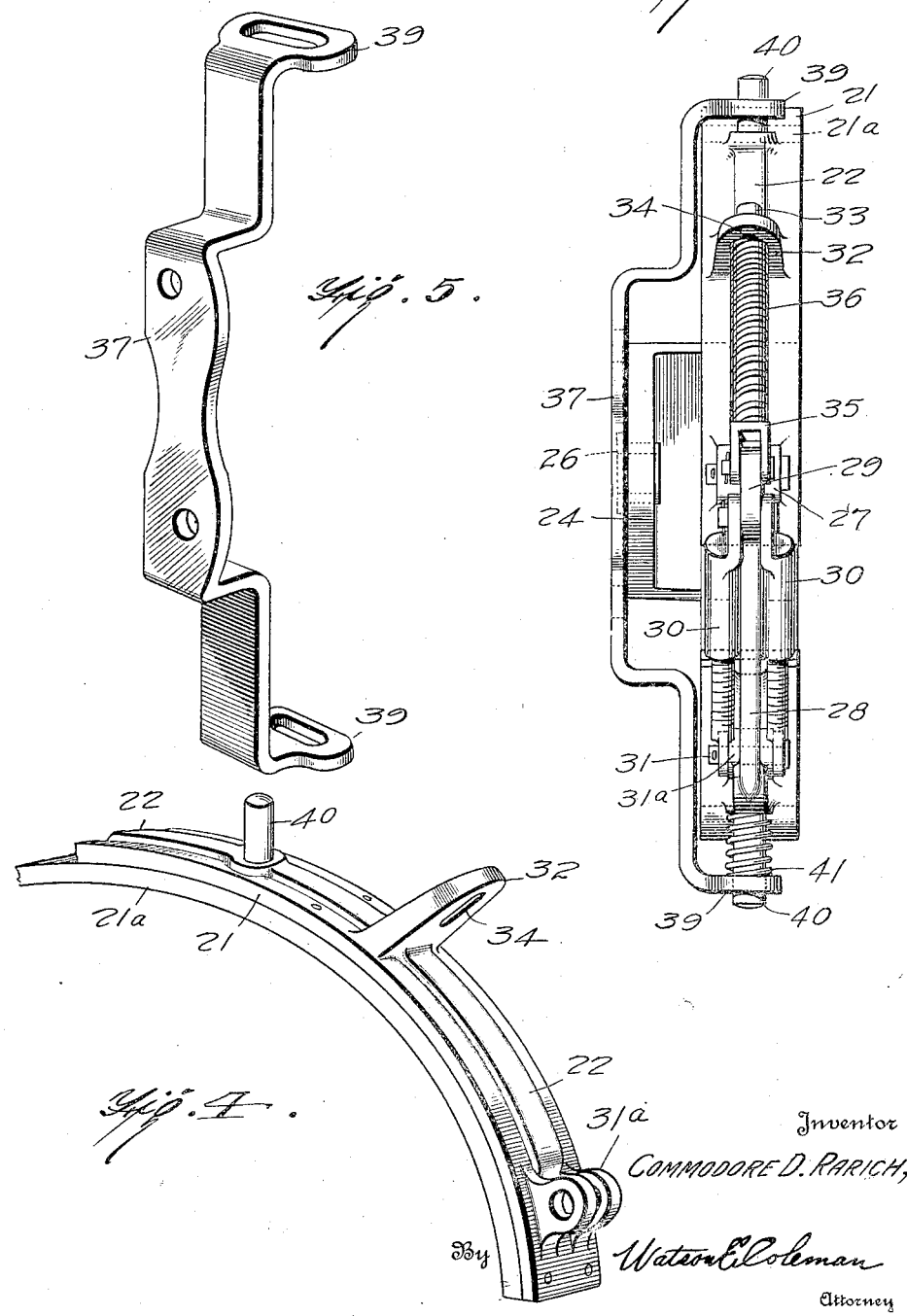

Patented Dec. 9, 1924.

1,518,704

UNITED STATES PATENT OFFICE.

COMMODORE D. RARICH, OF WILKES-BARRE, PENNSYLVANIA.

VEHICLE BRAKE.

Application filed February 14, 1924. Serial No. 692,788.

*To all whom it may concern:*

Be it known that I, COMMODORE D. RARICH, a citizen of the United States, residing at Wilkes-Barre, in the county of Luzerne and State of Pennsylvania, have invented certain new and useful Improvements in Vehicle Brakes, of which the following is a specification, reference being had to the accompanying drawings.

This invention relates to vehicle brakes and more particularly to an external band brake for use on automobiles.

An important object of the invention is to provide a device of this character which may be readily applied to the external surface of the braking drum of a vehicle upon which internal brakes are now employed, the invention residing in the construction of the external brake in such manner that the structure of the present brake drum is not altered in any manner and at the same time the external brake may be very readily applied.

A still further object of the invention is to provide in a device of this character means for supporting the brake so that a minimum friction of the brake upon the drum results when the brake is in the expanded or inoperative position.

A still further and more specific object of the invention is to provide means for supporting the ends of the brake band so as to hold the same elevated to prevent the band from dropping downwardly upon the drum so that it clips thereon due to the frictional engagement of the band with the drum thereby eliminating a waste of brake lining and the loss of efficiency due to the continual braking effect exercised by the band.

These and other objects I attain by the construction shown in the accompanying drawings, wherein for the purpose of illustration is shown a preferred embodiment of my invention and wherein:—

Figure 1 is a side elevation of brake mechanism constructed in accordance with my invention, the normal portions of the mechanism of the vehicle being indicated in dotted lines;

Figure 2 is a section on the line 2—2 of Figure 1;

Figure 3 is a front elevation of the brake mechanism;

Figure 4 is a perspective of the upper end section of the band;

Figure 5 is a perspective of the vertical stabilizing bar.

Referring now more particularly to the drawings, the numeral 10 indicates generally a wheel structure having projecting inwardly from its inner face a concentric annular flange 11. With the edges of the flange is aligned a plate 13 secured to the flange, the plate being stationary while the annulus 11 rotates. In the form of vehicle brake to which in the present embodiment I have shown my brake structure as applied internal brakes are employed. The same forming no portion of my invention are not herein illustrated or any portion thereof with the exception of a bolt 15 positioned at substantially the horizontal diametrical axis of the plate 13 at the rear side thereof, that is to say, the side of the plate lying rearwardly of the axle as regards the usual direction of travel of the vehicle. This place, being rigid to the axle, is further employed as a means for rigidifying the rear axle to the remainder of the drive mechanism and at vertically spaced points at the forward side thereof are a pair of securing elements 16 which extend through the arms 17 formed by forking the end of a radius rod 18. The brake in this type of vehicle is operated by a rod indicated at 19. These portions of the device form the normal construction of the vehicle to which my invention is to be applied and in no way claimed by me except in combination with the structure hereinafter described are shown in dotted lines.

The external brake comprises a split band 21 substantially circular in form and having its central portion relatively thickened, as more clearly shown in Figure 1, for the reason that upon this central portion the greatest strain of braking action is placed. The band for strengthening purposes is preferably, although not necessarily, provided with a centrally disposed outstanding rib 22 upon its outer surface. To the central portion of the band is secured and preferably formed integrally with the band an outstanding flange 23 the end of which is provided with an angular portion 24 directed generally toward the ends of the band and lying in a plane paralleling the general plane of the band. This flange has formed therein an elongated opening 25 extended upon the horizontal axis of the band in which is slidably mounted a sleeve washer 26 of greater length than the thickness of the extension 24. Through this sleeve washer the bolt 15 is extended and secured clamping the sleeve washer against the face of the plate 13 and preventing movement thereof but permitting bodily movement of the band 21 due to the formation of the slot 25 in the general direction of the horizontal axis of the drum and plate 13.

Adjacent one end the band is provided upon its outer surface with a pair of spaced lugs 27 between which is pivoted one end of a bell crank lever having a long arm 28 and a short arm 29 lying adjacent the pivot mounted in the ears 27. The end of the long arm 28 is adapted for engagement with the brake rod 19 so that the lever may be operated through this brake rod. The arm 29 has pivoted thereto at opposite sides thereof adjustable links 30 the opposite ends of which are engaged with opposite ends of a pivot pin 31 directed through a lug formed upon the band adjacent the opposite end thereof. It will be seen that by moving the long arm 28 in the direction of the arrow the ends of the band are caused to approach one another and accordingly the band will be clamped upon the annulus 11 to hold the wheel against rotation with relation to the plate 13 and thus apply a braking effect thereon. At a point spaced from the end of the band bearing the lugs or ears 27 the band is provided upon its outer surface with an outstanding apertured lug 32 which is disposed transversely of the band, the opening of which is approximately aligned with the lever arm 29. To this lever arm 29 is pivoted a rod 33 having its opposite end directed through the aperture 34 of the lug. Between the lug 32 and a shoulder 35 formed upon the rod 33 a spring 36 surrounds the rod. Since the lever is pivoted to the ears 27 this spring tends to urge the arm 28 thereof into engagement with the lug 31ª through which the pivot 31 is directed and will move the lever to this position immediately upon release of the strain of the controlling rod 19. Since this lever by its movement to this position tends to separate the ends of the band, the spring 33 acts at all times to separate the ends of the band to maintain these ends in separated position.

It will be obvious that with a construction of this character the tendency of the band if unsupported would be to sag about the sleeve washer as a center permitting the upper portion of the band to come into engagement with the brake drum where its frictional engagement therewith would tend to cause the band to clamp upon the annulus with the result that the brake lining would be worn and a certain degree of drive efficiency of the motor of the vehicle lost. It is to be remembered that the annulus 11 is rotating in the general direction of the arrow at practically all times during the operation of the vehicle with the result that it would tend to drag the end of the band bearing the lugs 27 with it and thus tightening engagement produced by gravity. I, therefore, provide a support 37 comprising a bar superimposed upon the ends of the arms 17 of the radius rod 18 and held in position upon these arms by the securing element 16 thereof. This support 37 is substantially vertically directed and has at its upper and lower ends horizontally disposed flanges 38 overlying and underlying the band. Each of these flanges has formed therein an opening 39 elongated in the general plane of the band and the band in alignment with these flanges is provided with vertically extending lugs 40 extending through the apertures. It will be seen that these lugs perform a primary function of maintaining the band in alignment with the annulus as regards the forward end thereof, this maintenance being attained at the rear end by the engagement of the flange terminal 24 with the sleeve washer 26. Between the upper surface of the lower flange and the band about the lower lug 40 of the band I mount a spring 41 which is of sufficient strength to support the weight of the band. It is pointed out that this spring has no weight to support other than the weight of the band and the mechanisms attached thereto at the forward end and accordingly the value of this spring can be very readily computed. This spring urges the band upwardly so as to prevent contact of the upper half thereof with the annulus when the brake is released. Since the movement of the lower half of the band will be upward upon contraction of the brake band, it will be seen that at no time will there be any compression of the spring 41 other than that imparted thereto by the weight of the parts mentioned and there is, therefore, no tendency of this spring to set to an extent that its operation would be impaired.

It will be seen from the foregoing that a brake constructed in accordance with my invention can be very readily applied to a vehicle braking structure ordinarily employing internal brakes and of the character above set forth. It will furthermore be seen that provision is made whereby the brake is maintained during the periods when it is out of operation in such position that it does not interfere in any manner with the normal operation of the vehicle. At the same time this structure may be cheaply produced and will be very durable in service. It will, of course, be understood that the band 21 will be provided with the usual lining 21ª which may be of any suitable character and attached to the band in any desirable manner, in the present instance rivets 21ᵇ are illustrated for this purpose. Many changes being possible in the construction of the device as hereinbefore set forth without in any manner departing from the spirit of my invention, I do not limit myself to such specific structure except as hereinafter claimed.

I claim:—

1. An external band brake for vehicles the driving wheels of which have a concentric annulus secured thereto, the vehicle having an axle structure including a stationary disk associated with the annulus, the stationary disk having an opening formed therein, comprising a split band surrounding the annulus and having its ends spaced, a connection between the ends of the band for constricting the same upon the annulus, a connection between the band and disk preventing rotation of the band with the annulus but permitting bodily shifting of the band in the plane of the annulus and in the general direction of its horizontal diameter, comprising a flange carried by said band centrally thereof and having a portion confronting that portion of the disk having the opening therein in spaced relation thereto, said portion having an elongated opening formed therein, the elongation of the opening being upon the horizontal diameter of the band, a securing element directed through said opening and engaging the disk to prevent dislodgment of the band with relation to the disk, and a sleeve washer surrounding the securing element and of greater length than the thickness of such portion.

2. An external band brake for vehicles the driving wheels of which have a concentric annulus secured thereto, the vehicle having an axle structure including a stationary disk associated with the annulus, comprising a split band surrounding the annulus and having its end spaced, a connection between the ends of the band for constricting the same upon the annulus, a connection between the band and disk preventing rotation of the band with the annulus but permitting bodily shifting of the band in the plane of the annulus and in the general direction of its horizontal diameter, said connection being at the center of the band, means secured to the disk and engaging the band adjacent the ends thereof for preventing misalignment of said ends with the annulus, and means extending between the lower end of the band and said member for maintaining the band in elevated position.

3. An external band brake for vehicles the driving wheels of which have a concentric annulus secured thereto, the vehicle having an axle structure including a stationary disk associated with the annulus, comprising a split band surrounding the annulus and having its ends spaced, a connection between the ends of the band for constricting the same upon the annulus, a connection between the band and disk preventing rotation of the band with the annulus but permitting bodily shifting of the band in the plane of the annulus and in the general direction of its horizontal diameter, said connection being at the center of the band, and means secured to the disk and engaging the band adjacent the ends thereof for preventing misalignment of said ends with the annulus, said means including a support having end portions overlying and underlying the band at the top and bottom thereof, said portions being provided with openings elongated in the general plane of the band, the band having lugs extending into said opening, and a spring surrounding the lug of the lower end of the band and extending between the band and the portion underlying the band for maintaining the band in elevated position.

4. In a brake, a split compression band provided adjacent the ends thereof with pivots, a bell crank lever having a short and a long arm pivoted to one of said pivots, a link connecting the other of the pivots and the free end of the short arm of the bell crank lever, a lug carried by the first named end of the band in spaced relation to the pivot thereof, a rod pivoted to the short arm of the bell crank lever and directed through an opening formed in the lug, and a spring surrounding the rod between the lug and a shoulder formed on said rod.

In testimony whereof I hereunto affix my signature.

COMMODORE D. RARICH.